Oct. 1, 1957      H. L. DIMKE      2,808,555
MOTOR PROTECTOR CIRCUIT AND THERMAL PROTECTOR THEREFOR
Filed June 25, 1956
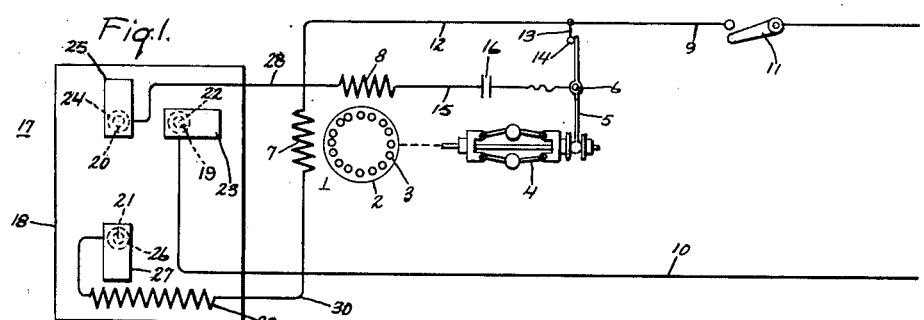
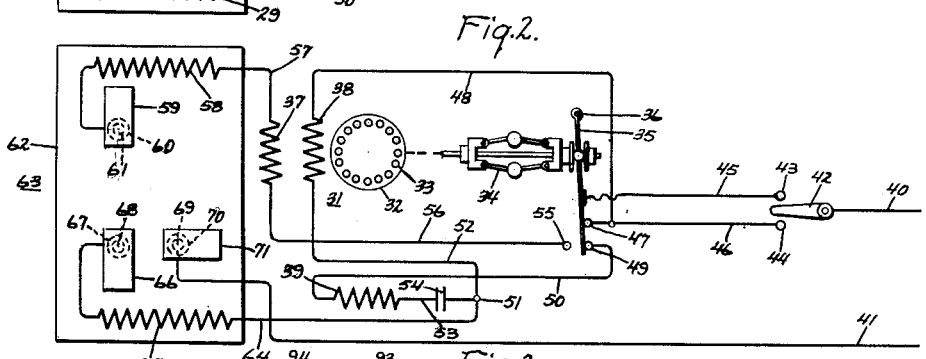
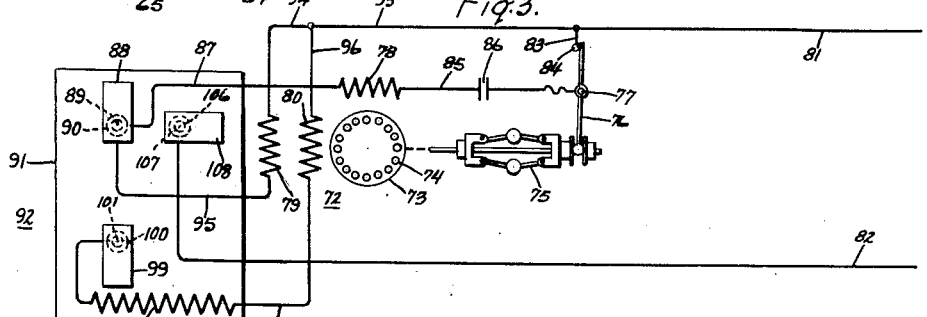
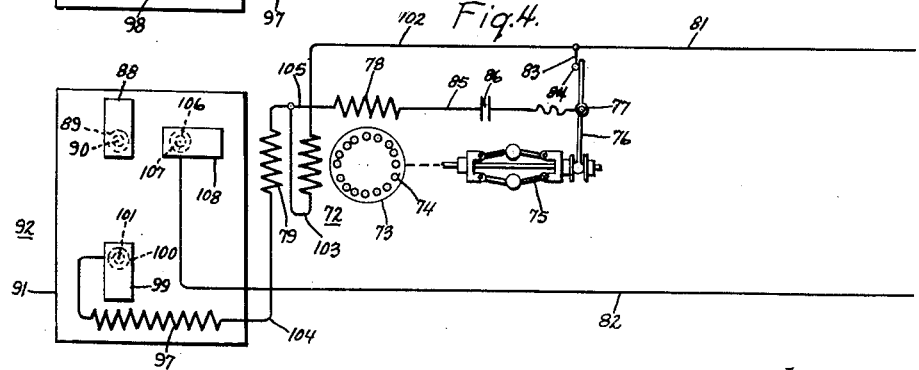
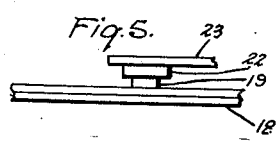
Inventor:
Harold L. Dimke,
by Robert G. Iriy
His Attorney.

United States Patent Office 2,808,555
Patented Oct. 1, 1957

2,808,555

MOTOR PROTECTOR CIRCUIT AND THERMAL PROTECTOR THEREFOR

Harold L. Dimke, Fort Wayne, Ind., assignor to General Electric Company, a corporation of New York Application June 25, 1956, Serial No. 593,572

11 Claims. (Cl. 318—221)

This invention relates to dynamoelectric machines, and more particularly to arrangements and constructions for providing thermal protection for induction machines where the machine has at least two winding circuits.

In motors having more than one winding circuit, it is most desirable to provide individual thermal protective arrangements for each circuit so that each may thus have protection tailored to its needs. For instance, it may well be desirable to have the same heat produced at the protector for each of two alternative arrangements despite the fact that the motor draws different currents with each circuit. Another possibility is that it may be desirable to decrease the heating effect of one of two winding circuits despite the fact that its current is quite high; this may arise where a winding is used for starting purposes only and it is desired that it affect the thermal protector only in case of a very high heat overload or when the motor shaft is locked.

Another important factor in bimetallic protective arrangements for motors is the life of the protector itself. This item is dependent to a great extent upon the current density in any part of the bimetal. Where the entire current in a high current arrangement has to pass across the same bimetallic path, there will obviously be greater stress upon the bimetallic element than in the case where the current is split up into different components, each having its own path. Thus, it is most desirable to provide a bimetallic element protector wherein it is possible to split up the current so that the current through different winding arrangements takes different paths across the bimetal. In addition, it is desirable to provide a bimetallic element which in itself makes possible different heating effects for different circuits.

It is, therefore, an object of this invention to provide an improved motor protective circuit incorporating the desirable features set forth above. A further object of the invention is to provide an improved bimetallic element protector.

In one embodiment thereof, the invention provides a thermal protector which includes a bimetallic element having a first contact surface arranged at a predetermined location on the element. First contact means are provided to be engageable with the first contact surface, and are intended to be connected to one side of a source of power. In addition, second and third contact surfaces are provided on the bimetallic element at different predetermined distances from the first surface, and second and third contact means are respectively engageable with the second and third contact surfaces. This improved protector may be arranged in a motor having at least two circuits so that the second and third contact means are respectively engageable with the two circuits.

The fact that the second and third contact surfaces are at different distances from the first contact surface means that the current through each winding circuit will traverse a different length of the bimetallic element and thus provide a different heating effect. In this manner, by suitable selection of the distances of the second and third contact surfaces from the first contact surface, each winding circuit may be arranged to have a predetermined effect on the bimetallic element.

The features of the invention which are believed to be novel are set forth with particularity in the appended claims. The invention itself, however, both as to its organization and method of operation, together with further objects and advantages thereof, may best be understood by reference to the following description taken in connection with the accompanying drawing.

In the drawing,

Figure 1 is a schematic diagram of an improved motor protective arrangement provided in accordance with this invention;

Figure 2 is a different circuit arrangement including the improved protective features of the invention;

Figures 3 and 4 are schematic diagrams showing two different connections of a motor utilizing the improved protective arrangement of the invention; and Figure 5 is a fragmentary side view of a part of the bimetallic element used in the arrangement of Figure 1.

Referring now to Figure 1 of the drawing, there is shown an induction motor, generally indicated at 1, having a rotor 2 provided with a squirrel cage winding including conductors 3 and end rings (not shown) at each end of the conductors. The rotor is connected to a centrifugal mechanism 4 which rotates therewith and controls a contact arm 5 pivoted on a pin 6. Motor 1 is provided with a pair of field windings 7 and 8 arranged in quadrature, winding 7 being formed as the main winding and winding 8 being formed as a starting winding. Motor 1 is connected across a source of alternating-current single-phase power (not shown) by a pair of lines 9 and 10, with a switch 11 being arranged in line 9 to control operation of the motor. Winding 7 is connected to line 9 through a line 12, while starting winding 8 is connected in parallel with winding 7 through a line 13, contact 14, contact arm 5 of centrifugal mechanism 4, and line 15. As shown, a phase displacing device such as capacitor 16 may be arranged in series with starting winding 8 so as to provide for displacement of the starting winding in time as well as in space.

A thermal protector, generally indicated at 17, includes a bimetallic disc-type element 18, a first contact surface 19, and a pair of additional contact surfaces 20 and 21 which are arranged at different distances from contact surface 19 and preferably angularly displaced from each other about surface 19 so that the current from each of them to contact surface 19 will traverse a different path across the bimetallic element 18. Contact surface 19 is arranged to be engaged by a contact 22 carried by a contact arm 23 which is in engagement with line 10. One possible physical construction for the parts is shown in Figure 5. In similar fashion, contact 24 on contact arm 25, and contact 26 on contact arm 27 are respectively engageable with contact surfaces 20 and 21. Contact arm 25 is connected through a line 28 to starting winding 8 while contact arm 27 is in series with a heating element 29 which is connected to main winding 7 through a line 30. Protection is provided in the usual manner: at a predetermined temperature of the element it will snap surfaces 19, 20, and 21 away from contacts 22, 24, and 26 to de-energize the windings.

It will be seen from the foregoing that a starting winding circuit including line 13, contact 14, contact arm 5, line 15 with capacitor 16, starting winding 8 and line 28 is arranged in series with contact arm 25 and contact 24. Also, a main winding circuit including line 12, main winding 7, and line 30 is arranged in series with heating coil 29, contact arm 27 and contact 26. Thus, the circuits for windings 7 and 8 are connected to bimetallic element 18 through contact surfaces 21 and 20 respectively. Since the current must flow from each of these contact surfaces to contact surface 19 in order to complete the motor circuit, a path of different length through bimetallic element 18 is provided for each of the winding circuits.

Normally, it is desirable to cause the starting winding 8 to have a rather small effect insofar as the protective arrangement is concerned, since it stays in the circuit only a short while; otherwise, if the protective arrangement is made very sensitive to the starting winding circuit, the risk of cycling increases. The desired effect of causing the starting winding circuit to have a relatively small effect is achieved by providing contact surfaces 20 relatively close to surface 19 so that the current through starting winding 8 will only have a short path through bimetallic element 18 and will cause relatively little heating thereof. On the other hand, it is desired that the protective arrangement be relatively more sensitive to the temperature in main winding 7. This is achieved by providing contact surface 21 relatively far from contact surface 19 so that the current which must pass between them has to traverse a relatively greater distance of bimetallic element 18 and thus has a greater heating effect. The effect of winding 7 may, of course, be increased even more by providing a heating coil such as that shown by 29 in series therewith and physically adjacent the bimetallic element in the known manner, as shown.

It will be seen from the foregoing, that each winding receives thermal protection tailored to its particular need and to the particular design of the motor. In addition, the current through the bimetallic element has been split into two different paths and thus the life of the bimetallic element has been increased.

Referring now to Figure 2, there is shown a two speed induction motor 31 having a rotor 32 with conductors 33 which form part of a squirrel cage winding as before. Rotor 32 is connected to a centrifugal mechanism 34 so as to cause it to rotate therewith, and rotation of centrifugal mechanism 34 controls the movement of a contact arm 35 pivoted at 36. Motor 31 is provided with two main windings 37 and 38 which are arranged to provide different speeds, usually by the provision of a different number of poles for each winding. A starting winding 39 having the same number of poles as main winding 38 is also provided. Motor 31 is adapted to be connected across a source of single-phase alternating-current power (not shown) through a pair of lines 40 and 41. Line 40 includes a switch 42 engageable with either one of a pair of contacts 43 and 44 respectively connected to lines 45 and 46.

When centrifugal mechanism contact arm 35 is in its standstill position, as shown, line 45 is connected to main winding 38 through the contact arm 35, contact 47, line 46 and line 48. The connection to starting winding 39 is achieved through the contact arm 35, contact 49 and line 50. Windings 38 and 39 are joined at point 51, through lines 52 and 53 respectively; line 53 may include capacitor 54 to provide suitable phase displacement between windings 38 and 39. When the centrifugal mechanism 34 moves contact arm 35 to its running position, line 45 is connected through the contact arm to contact 55 and line 56 which joins it to running winding 37. Winding 37 is in turn joined through line 57 and heating element 58 to contact arm 59 and contact 60. Contact 60 is engageable with contact surface 61 on bimetallic element 62 of the thermal protector generally indicated at 63. Main winding 38 and starting winding 39 are similarly joined by a line 64 and a heating element 65 to a contact arm 66 and a contact 67. Contact 67 is engageable with contact surface 68 on the bimetallic element 62; the circuit is completed to line 41 through contact surface 69, contact 70, and contact arm 71.

To describe the operation of motor 31, let it be assumed that switch 42 is moved into engagement with contact 43. This then connects line 40 to line 45 and contact arm 35. The main winding circuit is then provided through line 46, line 48, main winding 38, line 52 and line 64. The starting winding circuit is effected through line 50, starting winding 39, line 53 including capacitor 54, and line 64. Both main winding 38 and starting winding 39 are connected through line 64 to the heating coil 65, contact arm 66, contact 67, contact surface 68, across bimetallic element 62 to contact surface 69, contact 70, and contact arm 71 to line 41.

The motor thus has a complete circuit and the rotor will start; at a predetermined speed, mechanism 34 will flip arm 35 to the running position and into engagement with contact 55. In this position, a circuit through winding 37 is completed through line 56, the winding itself, and line 57. The winding circuit is connected across to the other side of the line through heating element 58, contact arm 59, contact 60, contact surface 61, across bimetallic element 62 to contact surface 69, contact 70 and contact arm 71. It will thus be observed that when contact arm 42 is moved into engagement with contact 43, the motor will start on windings 38 and 39 and, at a predetermined speed, will continue to run on winding 37. It will further be seen that windings 38 and 39 receive their thermal protection through heating element 65 and by the passage of current through bimetallic element 62 from contact surface 68 to contact surface 69. After the predetermined speed is reached and the motor runs on winding 37, the protection is obtained through heating element 58 and by the passage of current through bimetallic element 62 from surface 61 to surface 69. It will be observed that, as before, different path lengths through bimetallic element 62 are provided for different winding circuits. In the present case, the longer distance has been provided for winding 37 on the basis that two speed motors, of the type shown in Figure 2, are generally arranged to start on high speed, that is, winding 38 is the high speed main winding and winding 39 is a high speed start winding, with winding 37 being a low speed main winding. The high speed winding will demand more current and the lower speed winding will, of course, take less current. To equalize the heating effect from the two winding circuits, as is desirable, the high current of windings 38 and 39 traverses a relatively short path between surfaces 68 and 69 while the relatively low current of winding 37 traverses a relatively long path from surface 61 to surface 69. The longer path will cause a greater heating effect per unit of current and makes it possible substantially to equalize the heating effect of the two winding circuits.

When switch 42 is moved into engagement with contact 44, the connection to winding 38 is achieved through lines 46 and 48 independently of contact arm 35, while the connection to winding 39 is achieved through contact arm 35 and line 50. Thus, at the predetermined speed, the movement of the contact arm 35 will disconnect winding 39 but will have no effect upon the connection of winding 38 so that the motor will run at high speed. In this arrangement, the connection is entirely through contact surface 68 since the low speed (and low current) winding 37 is not utilized.

It will be seen that the embodiment of Figure 2 provides a protective arrangement whereby the positioning of surfaces 61, 68 and 69 can be so adjusted that the heating effect of each of the two alternative winding circuits (one including main winding 38 and starting winding 39, and the other including main winding 37) can be substantially equalized.

In addition to the advantages described for the arrangement of Figure 1, the motor of Figure 2 has the advantage that, since any desired heating effect may be obtained by varying the distance of the second and third contact surfaces 61 and 68 from contact surface 69, it is no longer necessary, as before, to utilize a very low resistance bimetallic element. In the past, this was done in order to avoid as far as possible any heating effect in the bimetallic element from the current through the windings since otherwise the effect of different currents in the alternative winding circuits would be magnified. The present arrangement makes the use of high resistance bimetals possible; as a result, yet another advantage is provided by the fact that cycling rates (the speed at which the bimetallic element will close the contacts after once having opened them) may be varied by utilizing different types of bimetals with different masses, different shapes, etc., previously precluded because of the requirement that the bimetal have a low resistance.

In the arrangement of Figure 2, two heating elements 58 and 65 have been provided in order to provide further possibilities for adjustment of the heating effect. However, it will be understood that it is possible to provide a bimetallic element with only one heating element or, conceivably, with no heating element if the resistance of the element and the length of the path can be selected and combined so as to provide by themselves the desired heating effect.

Referring now to Figure 3, there will be described the low voltage connection of a dual-voltage induction motor 72 having a rotor 73 with conductors 74 forming part of a squirrel cage winding as previously described. As before, the rotor is connected to a centrifugal mechanism 75 which controls the position of a contact arm 76 pivoted on a pin 77. Motor 72 has a starting winding 78 and a pair of running windings 79 and 80 which are generally made alike. The motor is adapted to be connected across a source of alternating-current single-phase power by a pair of lines 81 and 82. A starting winding circuit is completed through line 83, contact 84, contact arm 76, line 85 including capacitor 86, the winding 78, and line 87 to a contact arm 88 having a contact 89 arranged to engage a contact surface 90 provided on a bimetallic element 91 of a thermal protector generally indicated at 92. A circuit for main winding 79 is also completed to surface 90 through line 93, line 94, the winding 79, and line 95. The circuit for the other main winding 80 is completed through line 96, the main winding 80, and line 97 to heating element 98, contact arm 99 and contact 100, arranged to engage contact surface 101 of bimetallic element 91. Motor 72 is arranged to be connected to the other side of the line through contact surface 106 on element 91, contact 107 engageable therewith, and contact arm 108 which is connected to line 82.

Referring now to Figure 4, the same motor 72 is shown with, however, windings 78, 79, and 80 connected for high voltage operation. Instead of line 93 branching into lines 94 and 96 to provide parallel connection of windings 79 and 80 as in Figure 3, a line 102 connects winding 80 to line 81, and winding 79 is connected in series with winding 80 through a line 103. Winding 79 is then connected to heating element 97 through a line 104. Winding 78 is connected to the other two windings and to line 103 by a line 105.

With the connection of Figure 3, starting winding 78 is in parallel with both main windings 79 and 80 which are in parallel with each other. Both the starting winding circuit and the circuit of main winding 79 are connected to be in series with contact surface 90 while the circuit of main winding 80 is connected through to the contact surface 101. In Figure 4 on the other hand, where the high-voltage connection is provided, main windings 79 and 80 are in series with each other and form a circuit which is connected to contact surface 101 of the bimetallic element 91. Starting winding 78 is in parallel with main winding 80 for starting purposes.

At the low-voltage connection of Figure 3, the current supplied to the main windings 79 and 80 will run about twice as much during operation as for the high-voltage connection of Figure 4. For this reason, as is customary, the main windings 79 and 80 are connected in parallel at the low-voltage connection so that each winding receives only about half of the current, that is, the same amount of current that it will receive when connected in series at the high-voltage connection. In order to provide substantially the same amount of thermal protection, winding 79 is arranged to have its current pass between contact surfaces 90 and 106 at the low-voltage connection, so as to provide only a small heating effect. In this manner, only half the total current, that is, the current through the circuit of winding 80, will have a substantial effect since it traverses a substantially long bimetallic element path from surface 101 to surface 106.

At the high-voltage connection, shown in Figure 4, the smaller current, which is substantially equal to the current in winding 80 alone at the low-voltage connection of Figure 3, will traverse the same bimetallic element path from surface 101 to surface 106 so as to provide substantially the same heating effect.

Thus, for both connections, there will be approximately the same amount of heating effect from the current, and the bimetallic element will open at approximately the same over-load. In addition, at the lower voltage connection where the total current is considerably higher, two current paths are provided so that the current density is maintained within reasonable limits at all locations on the bimetallic element, thus prolonging the life of the element.

It will be seen from the foregoing that the invention provides an improved protective arrangement for motors whereby the protection for individual circuits can be designed with only that circuit in view rather than as a compromise suited to be acceptable for all the circuits. In addition, an improved bimetallic element is provided for the thermal protector where the construction of the element itself makes a far greater variety of bimetallic elements useful to the motor designer.

While the invention has been explained by describing particular embodiments thereof, it will be apparent that improvements and modifications may be made without departing from the scope of the invention as defined in the appended claims.

What I claim as new and desire to secure by Letters Patent of the United States is:

1. A motor having at least two winding circuits adapted to be connected to one side of a source of power, a thermal protector including a bimetallic element, a first contact surface arranged at a predetermined location on said element and electrically connected thereto, first contact means engageable with said first surface and adapted to be connected to the other side of the source of power, second and third contact surfaces arranged on said element at different predetermined distances from said first surface, said second and third contact surfaces being electrically connected to said element thereby to establish respectively current paths through said element from said first contact surface to said second contact surface and from said first contact surface to said third contact surface, and second and third contact means respectively engageable with said second and third contact surfaces and respectively in series with said winding circuits.

2. A thermal protector including a bimetallic element, a first contact surface arranged at a predetermined location on said element and electrically connected thereto, first contact means engageable with said first surface, second and third contact surfaces arranged on said element at different predetermined distances from said first surface, said second and third contact surfaces being electrically connected to said element thereby to establish respectively current paths through said element from said first contact surface to said second contact surface and from said first contact surface to said third contact surface, and second and third contact means respectively engageable with said second and third contact surfaces.

3. A thermal protector including a bimetallic element, a first contact surface arranged at a predetermined location on said element and electrically connected thereto, first contact means engageable with said first contact surface, second and third contact surfaces arranged on said element at different predetermined distances from said first surface, said second and third contact surfaces being angularly displaced from each other about said first surface, said second and third contact surfaces being electrically connected to said element thereby to establish respectively current paths between said first and second contact surfaces and between said first and third contact surfaces, and second and third contact means respectively engageable with said second and third contact surfaces.

4. A thermal protector including a bimetallic element, a first contact surface arranged at a predetermined location on said element and electrically connected thereto, first contact means engageable with said first surface, second and third contact surfaces arranged on said element at different predetermined distances from said first surface, said second and third contact surfaces being electrically connected to said element thereby to establish respectively current paths through said element between said first and second contact surfaces and between said first and third contact surfaces, second and third contact means respectively engageable with said second and third contact surfaces, and a heating coil physically adjacent said element and electrically in series with one of said second and third contact means.

5. A thermal protector including a bimetallic element, a first contact surface arranged at a predetermined location on said element and electrically connected thereto, first contact means engageable with said first surface, second and third contact surfaces arranged on said element at different predetermined distances from said first surface, second and third contact means respectively engageable with said second and third contact surfaces, said second and third contact surfaces being angularly displaced about said first surface from each other, said second and third contact surfaces being electrically connected to said element thereby to establish respectively current paths through said element between said first and second contact surfaces and between said first and third contact surfaces, and a heating coil physically adjacent said bimetallic element and electrically connected in series with that one of said second and third contact means engageable with the contact surface farthest from said first contact surface.

6. An induction-type motor having a pair of windings connected in parallel and adapted to be connected to one side of a source of power, a thermal protector including a bimetallic element, a first contact surface arranged at a predetermined location on said element and electrically connected thereto, first contact means engageable with said first surface and adapted to be connected to the other side of the source of power, second and third contact surfaces arranged on said element at different predetermined distances from said first surface, said second and third contact surfaces being electrically connected to said element thereby to establish respectively current paths through said element between said first and second contact surfaces and between said first and third contact surfaces, and second and third contact means respectively engageable with said second and third contact surfaces and respectively connected in series with said windings.

7. An induction-type motor having a main winding and a starting winding adapted to be connected to one side of a source of power, a thermal protector including a bimetallic element, a first contact surface arranged at a predetermined location on said element and electrically connected thereto, first contact means engageable with said first surface and adapted to be connected to the other side of the source of power, second and third contact surfaces arranged on said element respectively close to and far from said first surface, said second and third contact surfaces being electrically connected to said element thereby to establish respectively current paths through said element between said first and second contact surfaces and between said first and third contact surfaces, and second and third contact means respectively engageable with said second and third contact surfaces and respectively connected in series with said starting winding and said main winding, and a heating element physically adjacent said bimetallic element and connected in series with said third contact means.

8. An induction-type motor having a pair of alternatively energizable winding circuits adapted to be connected to one side of a source of power, a thermal protector including a bimetallic element, a first contact surface arranged at a predetermined location on said element and electrically connected thereto, first contact means engageable with said first surface and adapted to be connected to the other side of the source of power, second and third contact surfaces arranged on said element at different predetermined distances from said first surface, said second and third contact surfaces being electrically connected to said element thereby to establish respectively current paths through said element between said first and second contact surfaces and between said first and third contact surfaces, and second and third contact means respectively engageable with said second and third contact surfaces and respectively connected in series with said alternatively energizable circuits.

9. An induction-type motor having alternatively energizable high speed and low speed windings adapted to be connected to one side of a source of power, a thermal protector including a bimetallic element, a first contact surface arranged at a predetermined location on said element and electrically connected thereto, first contact means engageable with said first surface and adapted to be connected to the other side of the source of power, second and third contact surfaces arranged on said element respectively close to and far from said first surface, said second and third contact surfaces being electrically connected to said element thereby to establish respectively current paths through said element between said first and second contact surfaces and between said first and third contact surfaces, and second and third contact means respectively engageable with said second and third contact surfaces and respectively connected in series with said high speed winding and said low speed winding.

10. An induction-type motor having a pair of running windings alternatively connectable in series and in parallel with each other, said windings being adapted to be connected to one side of a source of power, a thermal protector including a bimetallic element, a first contact surface arranged at a predetermined location on said element and electrically connected thereto, first contact means engageable with said first surface and adapted to be connected to the other side of the source of power, second and third contact surfaces arranged on said element respectively close to and far from said first surface, said second and third contact surfaces being electrically connected to said element thereby to establish respectively current paths through said element between said first and second contact surfaces and between said first and third contact surfaces, and second and third contact means respectively engageable with said second and third contact surfaces, said main windings being connected in series with said third contact means when they are connected in series and being respectively connected in series with said second and third contact means when they are connected in parallel.

11. An induction-type motor having a pair of running windings alternatively connectable in series and in parallel with each other, said motor further having a starting winding connected in parallel with said main windings when they are in parallel with each other and in parallel with at least one of said main windings when they are in series with each other, said windings being adapted to be connected to one side of a source of power, a thermal protector including a bimetallic element and electrically connected thereto, a first contact surface arranged at a predetermined location on said element and electrically connected thereto, first contact means engageable with said first surface and adapted to be connected to the other side of the source of power, second and third contact surfaces arranged on said element respectively close to and far from said first surface, said second and third contact surfaces being electrically connected to said element thereby to establish respectively current paths through said element between said first and second contact surfaces and between said first and third contact surfaces, and second and third contact means respectively engageable with said second and third contact surfaces, one of said main windings being connected in series with said third contact means and said starting winding and the other of said main windings being connected in series with said second contact means when said main windings are arranged in parallel, all of said windings being connected in series with said third contact means when said main windings are arranged in series.

No references cited.